United States Patent
Leinonen et al.

(10) Patent No.: US 9,239,772 B2
(45) Date of Patent: Jan. 19, 2016

(54) DETECTING TRUE BATTERY REMOVAL FROM A HOST DEVICE BY COMPARING A VOLTAGE LEVEL ON A COMMUNICATION LINE WITH A THRESHOLD VOLTAGE LEVEL

(75) Inventors: Pekka Leinonen, Turku (FI); Rune Lindholm, Sottunga (FI)

(73) Assignee: Nokia Technologies Oy, Espoo (FI)

( * ) Notice: Subject to any disclaimer, the term of this patent is extended or adjusted under 35 U.S.C. 154(b) by 340 days.

(21) Appl. No.: 13/703,201

(22) PCT Filed: Jun. 11, 2010

(86) PCT No.: PCT/IB2010/052622
§ 371 (c)(1),
(2), (4) Date: Jan. 9, 2013

(87) PCT Pub. No.: WO2011/154781
PCT Pub. Date: Dec. 15, 2011

(65) Prior Publication Data
US 2013/0111251 A1    May 2, 2013

(51) Int. Cl.
*G06F 1/12*    (2006.01)
*G06F 11/30*   (2006.01)
*H04B 1/3883*  (2015.01)
(Continued)

(52) U.S. Cl.
CPC .............. *G06F 11/3058* (2013.01); *G06F 1/12* (2013.01); *G06F 1/26* (2013.01); *H02J 7/0063* (2013.01); *H04B 1/3883* (2013.01); *H02J 7/0021* (2013.01)

(58) Field of Classification Search
CPC ......... G06F 3/00; G06F 1/26; G06F 11/3058; G06F 1/263; G06F 1/30; G01R 31/3637; G01R 19/16542; G01R 19/16576; G01R 31/3648; H01M 10/4257; H02J 17/00
USPC ......................................................... 713/340
See application file for complete search history.

(56) References Cited

U.S. PATENT DOCUMENTS

| 6,167,289 A | 12/2000 | Balls et al. |
| 6,316,915 B1 * | 11/2001 | Fujiwara et al. .............. 320/134 |
| 6,381,477 B1 | 4/2002 | Johnson et al. |

(Continued)

FOREIGN PATENT DOCUMENTS

| CN | 101282047 | 10/2008 |
| JP | 7099732 | 4/1995 |

OTHER PUBLICATIONS

Translation of Chinese Office Action for Application No. 201080067352.9 dated Jul. 8, 2014.

*Primary Examiner* — Thomas Lee
*Assistant Examiner* — Santosh R Poudel
(74) *Attorney, Agent, or Firm* — Locke Lord LLP

(57) ABSTRACT

A method, an apparatus, and a computer program product embodiments are disclosed for detection of the availability of a battery (160) by a host terminal (100) during a data exchange session with the battery (160). In accordance with the embodiments of the invention, sampling, data communication with the battery pack (150), and detection of battery (160) removal, may occur substantially simultaneously. The battery (160) removal may be detected during data transmission from the terminal (100) to the battery pack (150). Moreover, a response may be received by the terminal (100) from the battery circuits (155) in response to data communicated to the battery (160) on the battery communication line (140), during sampling in a timed manner.

21 Claims, 10 Drawing Sheets

(51) Int. Cl.
*G06F 1/26* (2006.01)
*H02J 7/00* (2006.01)

(56) References Cited

U.S. PATENT DOCUMENTS

| | | | |
|---|---|---|---|
| 6,487,670 B1 | 11/2002 | Racino et al. | |
| 6,970,752 B1* | 11/2005 | Lim | H03M 11/24 |
| | | | 381/123 |
| 7,057,309 B2* | 6/2006 | Odaohhara | 307/80 |
| 2002/0118779 A1* | 8/2002 | Wu et al. | 375/345 |
| 2003/0159076 A1* | 8/2003 | Delisle et al. | 713/300 |
| 2004/0023688 A1* | 2/2004 | Bazarjani | H04M 1/72519 |
| | | | 455/557 |
| 2004/0215408 A1* | 10/2004 | Lamer | G06F 1/3203 |
| | | | 702/63 |
| 2005/0162132 A1 | 7/2005 | Nagasawa | |
| 2005/0163309 A1* | 7/2005 | Kim | H01M 10/48 |
| | | | 379/413 |
| 2006/0091858 A1* | 5/2006 | Johnson et al. | 320/128 |
| 2006/0190665 A1* | 8/2006 | Oshita et al. | 710/313 |
| 2006/0267554 A1 | 11/2006 | Cargonja et al. | |
| 2007/0182366 A1* | 8/2007 | Lee | 320/107 |
| 2008/0204044 A1* | 8/2008 | Ponnaluri et al. | 324/647 |
| 2008/0234010 A1 | 9/2008 | Sato et al. | |
| 2008/0258686 A1* | 10/2008 | Li et al. | 320/134 |
| 2009/0230778 A1* | 9/2009 | Alfven et al. | 307/116 |
| 2010/0141219 A1* | 6/2010 | Li | 320/162 |
| 2010/0253357 A1* | 10/2010 | Seo | G01R 19/16542 |
| | | | 324/427 |
| 2011/0033039 A1* | 2/2011 | Nagarajaiah et al. | 379/413.01 |
| 2011/0215767 A1* | 9/2011 | Johnson et al. | 320/136 |
| 2011/0260755 A1* | 10/2011 | Littow | 327/58 |
| 2014/0223037 A1* | 8/2014 | Minoo | G06F 1/1632 |
| | | | 710/16 |

* cited by examiner

DETECTING TRUE BATTERY REMOVAL FROM A HOST DEVICE BY COMPARING A VOLTAGE LEVEL ON A COMMUNICATION LINE WITH A THRESHOLD VOLTAGE LEVEL

FIELD

The field of the invention relates to the detection of the availability of a battery by a host terminal and more particularly to detecting the removal of a smart battery when the host terminal is transmitting data.

BACKGROUND

Batteries are essential for the portability of wireless terminals, for example cellular phones and other portable communication devices. The Subscriber Information Module (SIM) card is a programmable card in cellular phones, which stores all of a cell phone subscriber's personal information and phone settings. Battery removal detection in a cellular phone is a part of the battery interface in a cell phone because the SIM card needs to be powered off in controlled manner to be able to avoid being permanently damaged. In case of a sudden battery removal, a fast indication of battery removal to the SIM interface is needed because the SIM interface may loose power rapidly after battery removal. Recently cell phone batteries have included circuitry to identify the battery type, sense battery temperature, and store other related information. Temperature sensing, among other features, requires the ability of the cell phone to engage in data communication with the battery pack.

SUMMARY

Method, apparatus, and computer program product embodiments are disclosed for detection of the availability of a battery by a host terminal during a data exchange session with the battery. In accordance with embodiments of the invention, sampling, data communication with the battery pack, and detection of battery removal, may occur substantially simultaneously. Battery removal may be detected during data transmission from the terminal to the battery pack. Moreover, a response may be received by the terminal from the battery circuits in response to data communicated to the battery on the battery communication line, during sampling in a timed manner.

Example embodiments of the invention include a method, comprising the steps of:

comparing a voltage level with a threshold voltage level and providing a comparison signal resulting from the comparison, the voltage level being on a battery communication line coupled to a connector to circuits of a battery, wherein the voltage level comprises a predetermined low voltage level and a predetermined high voltage level used for communication with the circuits of the battery via the battery communication line to determine if the voltage of the battery connector exceeds the threshold voltage level, wherein the threshold voltage level is different from the predetermined low voltage level and the predetermined high voltage level;

sampling the comparison signal in a timed manner in order to ensure that communication with the circuits of the battery is not disturbing battery removal detection;

timing a duration with a timer, that the comparison signal corresponds to the voltage level exceeding the threshold voltage and triggering a battery status signal when the duration exceeds a predetermined delay; and determining a battery connection status based on the battery status signal.

Example embodiments of the invention include the method further comprising when the comparing step detects that the voltage of the battery connector is above the threshold voltage, then gating the voltage of the battery connector out as the comparison signal for sampling.

Example embodiments of the invention include a method, comprising the steps of:

sampling a voltage level in a timed manner on a battery communication line coupled to a connector to circuits of a battery, wherein the voltage level comprises a predetermined low voltage level and a predetermined high voltage level used for communication with the circuits of the battery via the battery communication line;

comparing the sampled voltage level with a threshold voltage level to determine if the voltage of the battery connector exceeds the threshold voltage level, wherein the threshold voltage level is different from the predetermined low voltage level and the predetermined high voltage level;

timing a duration with a timer, that the sampled voltage level exceeds the threshold voltage and triggering a battery status signal when the duration exceeds a predetermined delay; and determining a battery connection status based on the battery status signal.

Example embodiments of the invention include the method further comprising when sampling the voltage of the battery connector, gating the voltage of the battery connector as the sampled voltage level for the comparing step.

Example embodiments of the invention include the method further comprising wherein the duration represents a period of time that includes the length of time that the voltage level exceeds the threshold voltage plus a predetermined delay.

Example embodiments of the invention include the method further comprising wherein the battery connections status comprises at least a battery connect status or battery disconnect status.

Example embodiments of the invention include the method further comprising wherein the battery connection status changes from the battery connect status to the battery disconnect status if the duration is equal to or longer than a predetermined duration value.

Example embodiments of the invention include the method further comprising wherein the battery connection status changes from the battery disconnect status to the battery connect status if the voltage level is similar to or less than the predetermined high voltage level.

Example embodiments of the invention include the method further comprising resetting the timer if the voltage level is substantially similar to or less than the predetermined low voltage level.

Example embodiments of the invention include the method further comprising wherein the battery connector has at least two further connectors.

Example embodiments of the invention include the method further comprising wherein the at least two further connectors are configured to deliver power.

Example embodiments of the invention include the method further comprising wherein the sampling, the communication, and detection of battery removal, occur substantially simultaneously.

Example embodiments of the invention include the method further comprising receiving a response from the battery circuits to data communicated to the battery on the battery communication line during the sampling in the timed manner.

Example embodiments of the invention include an apparatus, comprising:
  at least one processor;
  at least one memory including computer program code;
  the at least one memory and the computer program code configured to, with the at least one processor, cause the coexistence manager at least to:
  compare a voltage level with a threshold voltage level and provide a comparison signal resulting from the comparison, the voltage level being on a battery communication line coupled to a connector to circuits of a battery, wherein the voltage level comprises a predetermined low voltage level and a predetermined high voltage level used for communication with the circuits of the battery via the battery communication line to determine if the voltage of the battery connector exceeds the threshold voltage level, wherein the threshold voltage level is different from the predetermined low voltage level and the predetermined high voltage level;
  sample the comparison signal in a timed manner in order to ensure that communication with the circuits of the battery is not disturbing battery removal detection;
  time a duration with a timer, that the comparison signal corresponds to the voltage level exceeding the threshold voltage and trigger a battery status signal when the duration exceeds a predetermined delay; and
  determine a battery connection status based on the battery status signal.

Example embodiments of the invention include an apparatus, comprising:
  at least one processor;
  at least one memory including computer program code;
  the at least one memory and the computer program code configured to, with the at least one processor, cause the coexistence manager at least to:
  sample a voltage level in a timed manner on a battery communication line coupled to a connector to circuits of a battery, wherein the voltage level comprises a predetermined low voltage level and a predetermined high voltage level used for communication with the circuits of the battery via the battery communication line;
  compare the sampled voltage level with a threshold voltage level to determine if the voltage of the battery connector exceeds the threshold voltage level, wherein the threshold voltage level is different from the predetermined low voltage level and the predetermined high voltage level;
  time a duration with a timer, that the sampled voltage level exceeds the threshold voltage and trigger a battery status signal when the duration exceeds a predetermined delay; and
  determine a battery connection status based on the battery status signal.

Example embodiments of the invention include a computer readable medium, comprising program instructions, which when executed by a computer processor, perform the steps comprising:
  comparing a voltage level with a threshold voltage level and providing a comparison signal resulting from the comparison, the voltage level being on a battery communication line coupled to a connector to circuits of a battery, wherein the voltage level comprises a predetermined low voltage level and a predetermined high voltage level used for communication with the circuits of the battery via the battery communication line to determine if the voltage of the battery connector exceeds the threshold voltage level, wherein the threshold voltage level is different from the predetermined low voltage level and the predetermined high voltage level;
  sampling the comparison signal in a timed manner in order to ensure that communication with the circuits of the battery is not disturbing battery removal detection;
  timing a duration with a timer, that the comparison signal corresponds to the voltage level exceeding the threshold voltage and triggering a battery status signal when the duration exceeds a predetermined delay; and
  determining a battery connection status based on the battery status signal.

Example embodiments of the invention include a computer readable medium, comprising program instructions, which when executed by a computer processor, perform the steps comprising:
  sampling a voltage level in a timed manner on a battery communication line coupled to a connector to circuits of a battery, wherein the voltage level comprises a predetermined low voltage level and a predetermined high voltage level used for communication with the circuits of the battery via the battery communication line;
  comparing the sampled voltage level with a threshold voltage level to determine if the voltage of the battery connector exceeds the threshold voltage level, wherein the threshold voltage level is different from the predetermined low voltage level and the predetermined high voltage level;
  timing a duration with a timer, that the sampled voltage level exceeds the threshold voltage and triggering a battery status signal when the duration exceeds a predetermined delay; and
  determining a battery connection status based on the battery status signal.

Example embodiments of the invention include a system, comprising:
  a battery in a battery pack, the battery configured to connect to power connectors of a wireless terminal to provide operating power to the wireless terminal;
  battery circuits in the battery pack, the battery circuits associated with the battery and configured to connect to a battery connector of the wireless terminal; and
  a wireless terminal, comprising:
    at least one processor;
    at least one memory including computer program code;
    the at least one memory and the computer program code configured to, with the at least one processor, cause the coexistence manager at least to:
    compare a voltage level with a threshold voltage level and provide a comparison signal resulting from the comparison, the voltage level being on a battery communication line coupled to the battery connector, wherein the voltage level comprises at least one predetermined low voltage level and at least one predetermined high voltage level used for communication with the battery circuits coupled to the battery connector via the battery communication line to determine if the voltage of the battery connector exceeds the threshold voltage level, wherein the threshold voltage level is different from the at least one predetermined low voltage level and the at least one predetermined high voltage level;
    sample the comparison signal in a timed manner in order to ensure that communication with the battery circuits is not disturbing battery removal detection;
    time a duration with a timer, that the comparison signal corresponds to the voltage level exceeding the threshold voltage and trigger a battery status signal after the duration exceeds a predetermined delay; and
    determine a battery connection status based on the battery status signal.

The resulting embodiments provide the detection of the availability of a battery by a host terminal and more particularly, detecting the removal of a smart battery during a data exchange session with the battery.

DISCUSSION OF EXAMPLE EMBODIMENTS OF THE INVENTION

Batteries are essential for the portability of wireless terminals, for example cellular phones and other portable communication devices. The Subscriber Information Module (SIM) card is a programmable card in cellular phones, which stores all of a cell phone subscriber's personal information and phone settings. Battery removal detection in a cellular phone is an important part of the battery interface in a cell phone. The battery removal detection may enable a controlled power off of the SIM card to avoid being permanently damaged. In case of a sudden battery removal, a fast indication of battery removal is needed because the SIM interface may loose power rapidly after battery removal. Recently cell phone batteries have included circuitry to identify the battery type, sense battery temperature, and store other related information. Temperature sensing, among other features, requires the ability of the cell phone to engage in digital communication with the battery pack.

Figure 1:
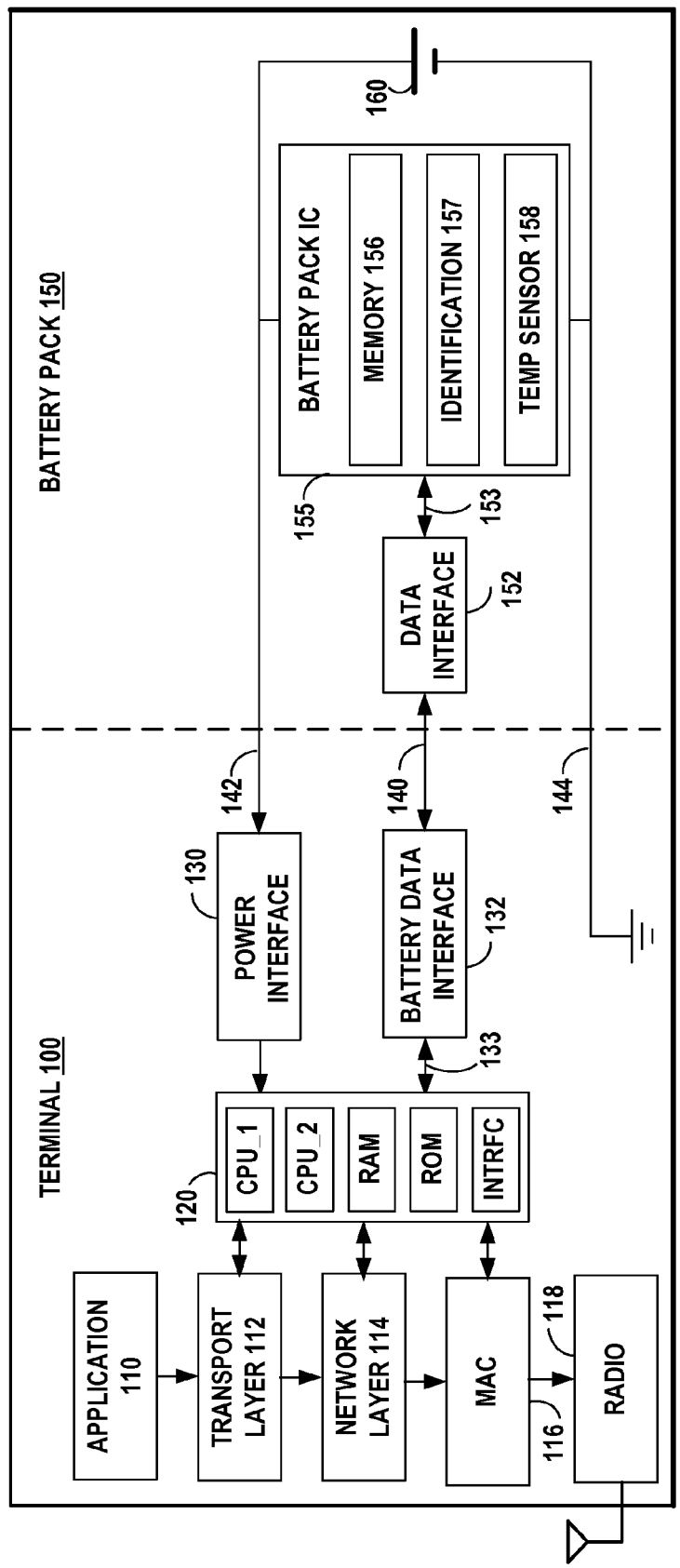
FIG. 1 is an example system architecture diagram according to an example embodiment of the present invention, illustrating an example wireless terminal and an example battery pack.

FIG. 1 is an example system architecture diagram according to an example embodiment of the present invention, illustrating an example wireless terminal like a mobile terminal 100 and an example battery pack 150 that includes a memory 156, identification register 157, and temperature sensor 158. The power from the battery 160 is provided to the terminal's power interface 130 on the power connectors 142 and 144. The data exchanged between the terminal 100 and the battery pack integrated circuit (IC) 155 passes from the processor 120 in the terminal 100 over the line 133 to the battery data interface 132 in the terminal 100, and through the communication line 140 that may be part of a battery connector to the data interface 152 in the battery pack 150 and over the line 153 to the battery pack integrated circuit (IC) 155. The identification register 157 in the battery pack IC 155 includes a memory to store data in the battery pack to extend its functionality. Battery type identification 157 is needed for battery types, which may have different charging parameters like for example higher charging target voltage, compared to traditional Li-Ion batteries. The memory 156 may store data related to battery technology and monitoring. The devices in the battery pack IC 155 may be active devices that transmit to the terminal 100 over the battery communication line 140 using their own timing reference. A protocol may be used for digital data communication via the communication line. The protocol may be initiated through a reset or based on a request. This starts the data communication from the battery pack IC 155. In every communication there is a "learning sequence" where the terminal 100 may detect the battery pack timing. The terminal 100 will then adjust to this timing for its reception and transmission with the battery pack. The protocol allows the terminal 100, which has accurate timing, to adjust the timing based on the type of the battery pack, so that the battery pack does not need its own accurate timing reference. The battery communication line 140 may be used for digital communication and also for analog identification of the battery, for example based on an analog voltage over predefined resistor values.

The example wireless terminal 100 includes a protocol stack, including the radio 118 and the media access control (MAC) 116, which may be based, for example, on various cellular telephone network standards, wireless local area network (LAN) standards, or other wireless communications standards including cellular communication. Other network types may make use of example embodiments of the invention. The protocol stack may also include a network layer 114, a transport layer 112, and an application program 110. The example wireless terminal 100 includes a processor 120 that may include a dual core central processing unit (CPU) CPU_1 and CPU_2, a random-access memory (RAM) memory, a read-only memory (ROM) memory, and an interface for a keypad, display, and other input/output devices. The interface circuits may interface with one or more radio transceivers, battery and other power sources, key pad, touch screen, display, microphone, speakers, ear pieces, camera or other imaging devices, etc. The RAM and ROM may be removable memory devices such as smart cards, SIMs, wireless identification modules (WIMs), semiconductor memories such as RAM, ROM, programmable read-only memories (PROMS), flash memory devices, etc. The processor protocol stack layers, and/or application program may be embodied as program logic stored in the RAM and/or ROM in the form of sequences of programmed instructions which, when executed in the CPU, carry out the functions of the disclosed embodiments. The program logic may be delivered to the writeable RAM, PROMS, flash memory devices, etc. of the coexistence enabler and coexistence manager from a computer program product or article of manufacture in the form of computer-usable media such as resident memory devices, smart cards or other removable memory devices, or in the form of program logic transmitted over any transmitting medium which transmits such a program. Alternately, they may be embodied as integrated circuit logic in the form of programmed logic arrays or custom designed application specific integrated circuits (ASIC). The one or more radios in the device may be separate transceiver circuits or alternately, the one or more radios may be a single radio frequency (RF) module capable of handling one or multiple channels in a high speed, time and frequency multiplexed manner in response to the processor.

Figure 2A:
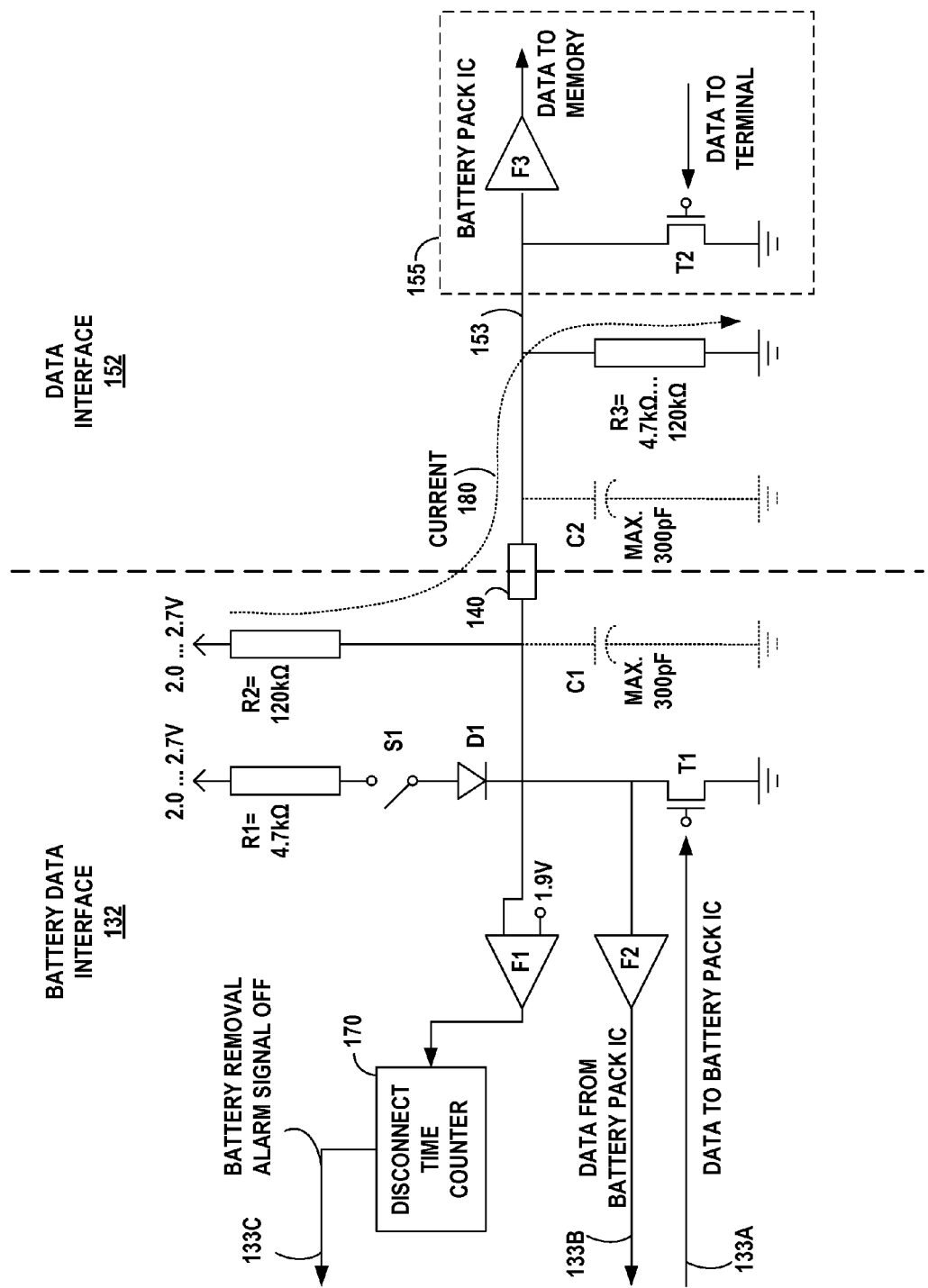
FIG. 2A is an example network diagram of the example battery data interface of the wireless terminal operatively connected by a communication line connector to the example data interface of the battery pack of FIG. 1.
Figure 2B:
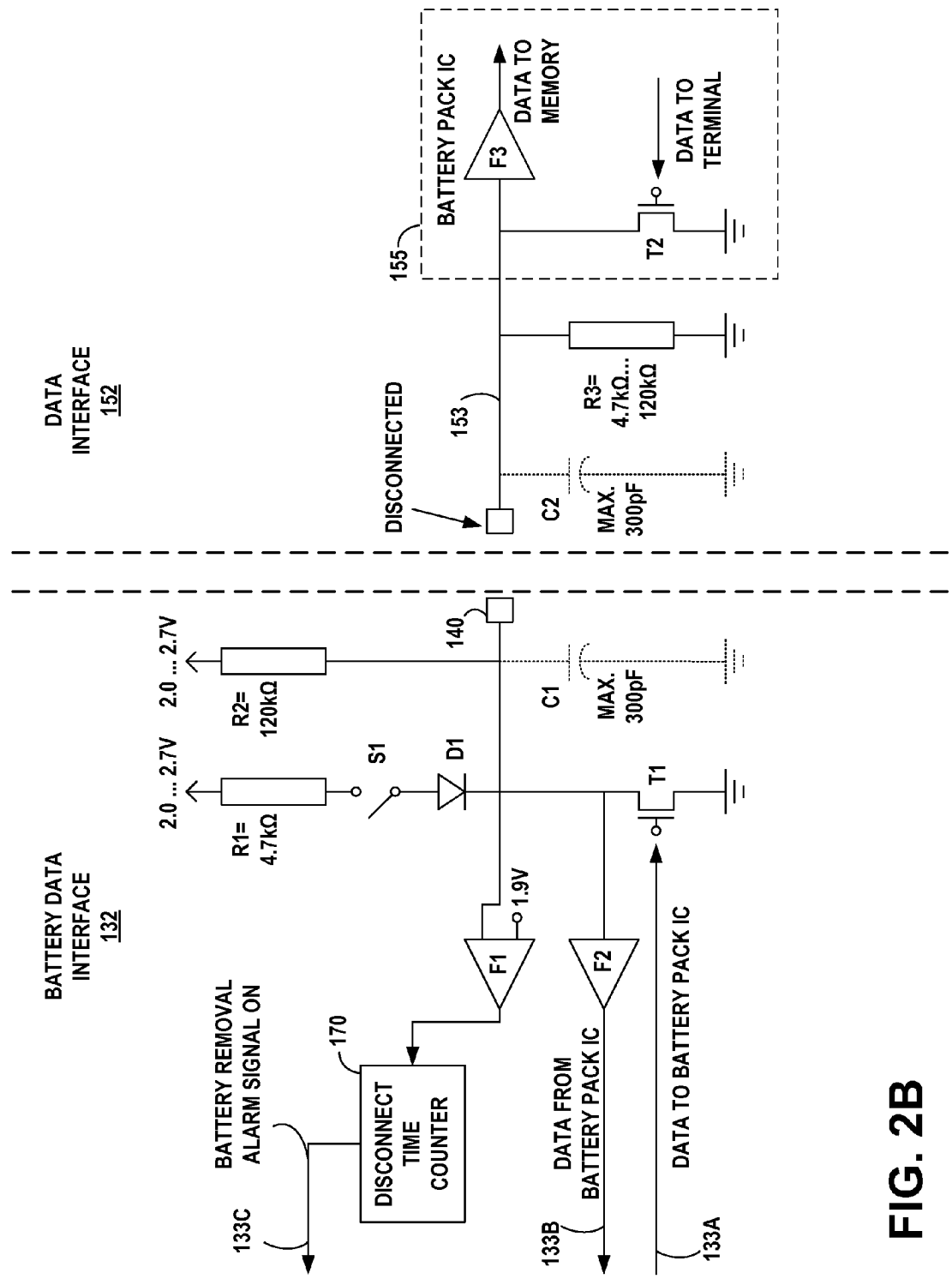
FIG. 2B is an example network diagram of the battery data interface of the wireless terminal disconnected at a communication line connector from the data interface of the battery pack of FIG. 1.
Figure 2C:
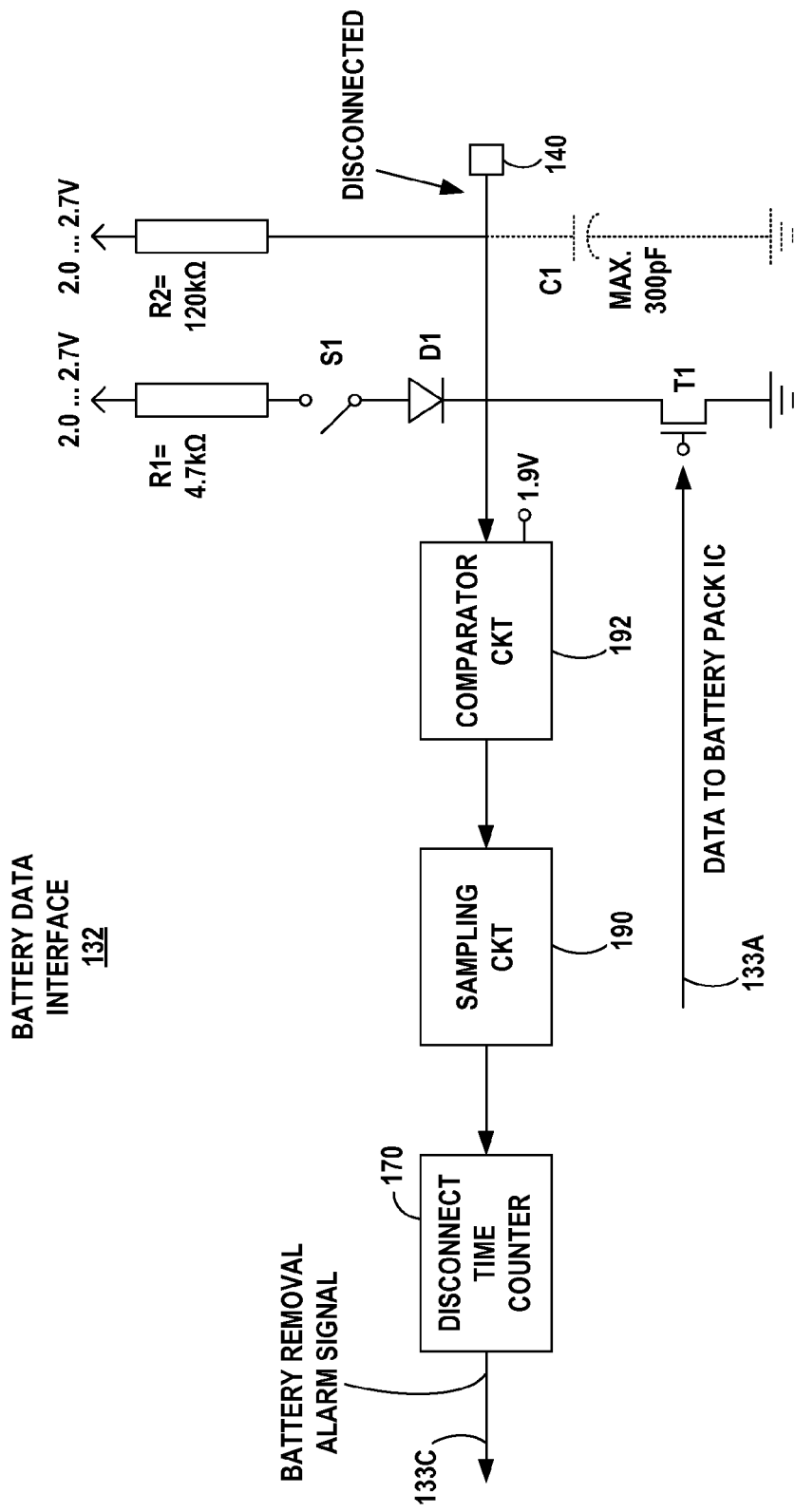
FIG. 2C is an example network diagram of the battery data interface of the wireless terminal, illustrating in greater detail a sampling circuit, a comparator circuit, and a disconnect time counter.

FIG. 2A is an example network diagram of the example battery data interface 132 of the wireless terminal 100 operatively connected by the communication line and its communication line connector 140 that may be comprised in a battery connector to the example data interface 152 of the battery pack 150 of FIG. 1. FIG. 2B is an example network diagram of the battery data interface 132 of the wireless terminal 100 disconnected at the communication line connector 140 from the data interface 152 of the battery pack 150 of FIG. 1. FIG. 2C is an example network diagram of the battery data interface 132 of the wireless terminal 100, illustrating in greater detail the sampling circuit 190, comparator circuit 192, and disconnect time counter 170. In accordance with embodiments of the invention, the sampling, the digital communication with the battery pack, and detection of battery removal, occur substantially simultaneously. Moreover, a response may be received by the terminal 100 from the battery circuits in response to data communicated to the battery on the battery communication line during the sampling in the timed manner. This may ensure that the terminal transmission is not disturbing the battery removal detection.

Figure 2D:
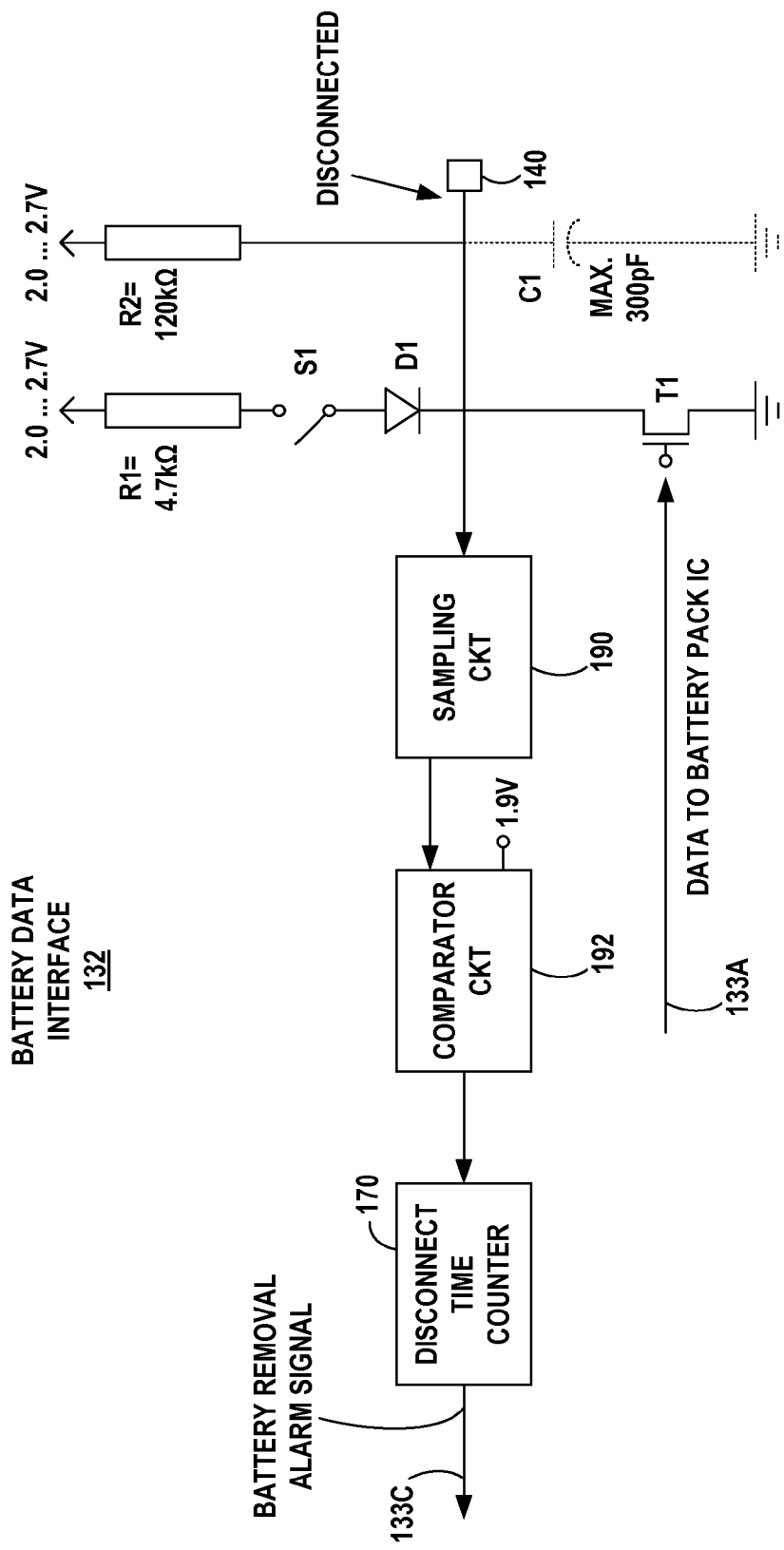
FIG. 2D is an example network diagram of an alternate embodiment of the battery data interface of the wireless terminal, illustrating in greater detail a different order in the sampling circuit, the comparator circuit, and the disconnect time counter from the order shown in FIG. 2C.

Two example embodiments of the battery data interface 132 are shown in FIG. 2C and FIG. 2D. FIG. 2C shows an example first embodiment of the battery data interface 132. The comparator circuit 192 has one leg of its input connected to the communication line connector 140 whose voltage is compared with the threshold voltage, for example 1.9 volts, on the other input leg of the comparator. The comparator 192 in FIG. 2C compares the voltage level with a threshold voltage level and provides a comparison signal resulting from the comparison. In example embodiments of the invention, when the comparator circuit 192 in FIG. 2C detects that the voltage of the connector 140 is above the threshold voltage, the comparator circuit 192 gates the voltage of the connector 140 out as the comparison signal to the sampling circuit 190. The voltage level on the battery communication line 140 may be at least one predetermined low voltage level and at least one predetermined high voltage level used for communication with the circuits of the battery. The threshold voltage level is different from the predetermined low voltage level and the predetermined high voltage level. The sampling circuit 190 is connected to the output of the comparator 192 in FIG. 2C, for sampling the comparison signal in a timed manner in order to ensure that communication with the circuits of the battery is not disturbing battery removal detection. The disconnect time counter 170 is connected to the output of the sampling circuit 190, for timing a duration with a timer, of the comparison signal that corresponds to the voltage level of battery communication line 140 exceeding the threshold voltage. The disconnect time counter 170 will trigger a battery status signal on line 133C when the duration exceeds a predetermined delay.

FIG. 2D shows an example second embodiment of the battery data interface 132. The sampling circuit 190 has its input connected to the communication line connector 140 for sampling the voltage level of communication line connector 140 in a timed manner. In example embodiments of the invention, when the sampling circuit 190 in FIG. 2D samples the voltage of the connector 140, the sampling circuit 190 gates the voltage of the connector 140 out to the comparator circuit 192. The comparator circuit 192 is shown in FIG. 2D with one leg of its input connected to the output of the sampling circuit 190 for comparing the sampled voltage level with a threshold voltage level. The disconnect time counter 170 is shown in FIG. 2D connected to the output of the comparator circuit 192, for timing a duration with a timer, that the sampled voltage level exceeds the threshold voltage. The disconnect time counter 170 will trigger a battery status signal on line 133C when the duration exceeds a predetermined delay.

The battery data interface 132 has three pin interface (Vdd, Vss and a single communication line connector 140). The battery data interface 132 enables multiplexing and/or substantially simultaneously handling of data communication and battery removal detection. The battery data interface 132 uses the clocked logic in the terminal 100. The Vdd voltage is directly or indirectly getting power from the positive terminal of the battery pack 150. The Vdd voltage provides sufficient power not only for identification and memory reading, but may also be used for programming of the memory 156.

The data communication over line 140 may be multiplexed with battery removal detection. Battery communication line 140 high state voltage is determined by voltage divider pull up resistor R2 in terminal 100 and pull down resistor R3 in the battery pack 150. But, when the battery pack 150 is removed, the pull down resistor R3 gets disconnected from terminal 100 and therefore communication line 140 voltage rises. The voltage rise is detected by a comparator F1, also shown as comparator circuit 192 in FIGS. 2C and 2D. When the terminal 100 is transmitting data over the communication line connector 140 to the battery pack IC 155, transistor T1 in the terminal 100 is pulling communication line 140 low during communication line low periods.

The battery data interface of the terminal 100 samples the voltage level with the sampling circuit 190 in FIGS. 2C and 2D in a timed manner. In FIG. 2C the sampling circuit 190 samples the comparison signal output from the comparator 192. In FIG. 2D the sampling circuit 190 samples the voltage level of communication line connector 140. The disconnect time counter 170 of FIGS. 2C and 2D times the duration with a timer, that the sampled voltage level exceeds the threshold voltage and it triggers a battery status signal on line 133C when the duration exceeds a predetermined delay. The status signal may indicate the removal of the battery or the reconnection of the battery. The duration represents a period of time that includes the length of time that the voltage level exceeds the threshold voltage plus a predetermined delay. In accordance with embodiments of the invention, the sampling, the digital communication with the battery pack, and detection of battery removal, occur substantially simultaneously.

The battery connection status changes from the battery connect status to the battery disconnect status if the duration is equal to or longer than a predetermined duration value. The battery connection status changes back from the battery disconnect status to the battery connect status if the voltage level is similar to or less than the predetermined high voltage level. The timer is reset if the voltage level is substantially similar to or less than the predetermined low voltage level.

The battery connector may include the positive power connection 142 and the ground connection 144 of FIG. 1.

In accordance with embodiments of the invention, battery removal detection is performed with the same battery communication line 140 that is used for data communication between the terminal 100 and battery pack 150. Battery removal detection may be performed at the time when the terminal 100 is transmitting data to battery pack 150.

When communication the battery communication line 140 between mobile terminal 100 and battery pack 150 is disconnected for long enough period of time, battery removal indication is created on line 133C.

Short connect breaks in communication line contact 140 between terminal 100 and battery pack 150 are filtered out in a way that these short contact breaks are not causing a battery removal indication.

The battery removal detection circuitry 170 is synchronized with terminal 100 transmission to the battery pack 150. At the time when terminal 100 is pulling battery communication line 140 actively low, input to battery removal circuitry 170 is masked (for example battery removal detection circuitry 170 does not monitor status of communication line connector 140 when terminal 100 is pulling battery communication line 140 actively low).

When battery communication line 140 voltage rises above a battery removal detection threshold level, battery removal detection time counter 170 starts time measurement. If battery communication line 140 voltage falls below battery removal detection threshold level for other reasons than because of terminal 100 pulling battery communication line 140 actively low, time counter 170 is reset and stopped until battery communication line 140 voltage rises above the battery removal detection threshold level again. If battery removal detection time counter 170 reaches the time that is equal or higher than the time defined as maximum length of contact breaks, battery removal is indicated for other subsystem(/s) of terminal 100.

In example embodiments of the invention, time counter 170 may reach a duration that is equal to or higher than the interval defined as maximum length of contact breaks, at the same time when terminal 100 is pulling battery communication line 140 actively low. To insure that a false positive determination might not otherwise be made, erroneously indicating that there has been a disconnection, the example embodiments may wait until the battery removal detection circuitry 170 detects that the battery communication line 140 goes high one more time, before indicating that battery removal event has occurred.

The battery data interface 132 is connected to the data interface 152 in FIG. 2A by the communication line connector 140. Data to be sent to the battery pack IC 155 is transferred from the processor 120 over line 133A to the gate of field-effect transistor (FET) device T1, which pulls the battery communication line 140 down to a low value of approximately 0.1 volts. Switch S1 is closed when there is data communication on the line 133A from the terminal to the battery pack. S1 is closed during the entire data transmission from the terminal to the battery pack. The forward bias drop of diode D1 enables reduction of the voltage on the interface to 1.4-1.5V. 2) and/or, which prevents resistor R1 from affecting the pull-up voltage at connector 140, in case the pull-up voltage on R2 is higher than 2.1V, for example 2.7V. The current 180 flows through R2 and the communication line connector 140 and through R3, forming a resistor divider that keeps the voltage of the battery communication line 140 below the threshold voltage of approximately 1.80 volts when the battery is connected to the terminal. The value of R3 may depend on the battery capacity. If the connector line 140 is disconnected, the current 180 is interrupted and the resistor R2 pulls up the voltage on battery communication line 140. The FET device T2 in the battery pack IC 155 is part of active circuitry that transmits data to the terminal 100 over battery communication line 140. Data from the battery pack is transferred over battery communication line 140 and through F2 and line 133B, to the processor 120 in the terminal 100. The voltage of the data pulses on line 133B are approximately 1.8 volts for high signaling and 0.25 volts for low signaling. The capacitances C1 and C2 are parasitic capacitances.

The functions performed by the functional amplifiers F1, F2, and F3 in FIG. 2A are as follows. F1 is the comparator that monitors the battery connection for battery removal. If the voltage on the line goes above a predefined value the comparator will trigger, value in the range of 1.7-1.9V. F2 is the input buffer that conveys the data from the battery pack to the terminal. This is a normal input buffer with the threshold in the range of 0.8-1V. F3 is the corresponding buffer for the data from the terminal to the battery pack. F2 and F3 are digital input buffers.

Figure 3:
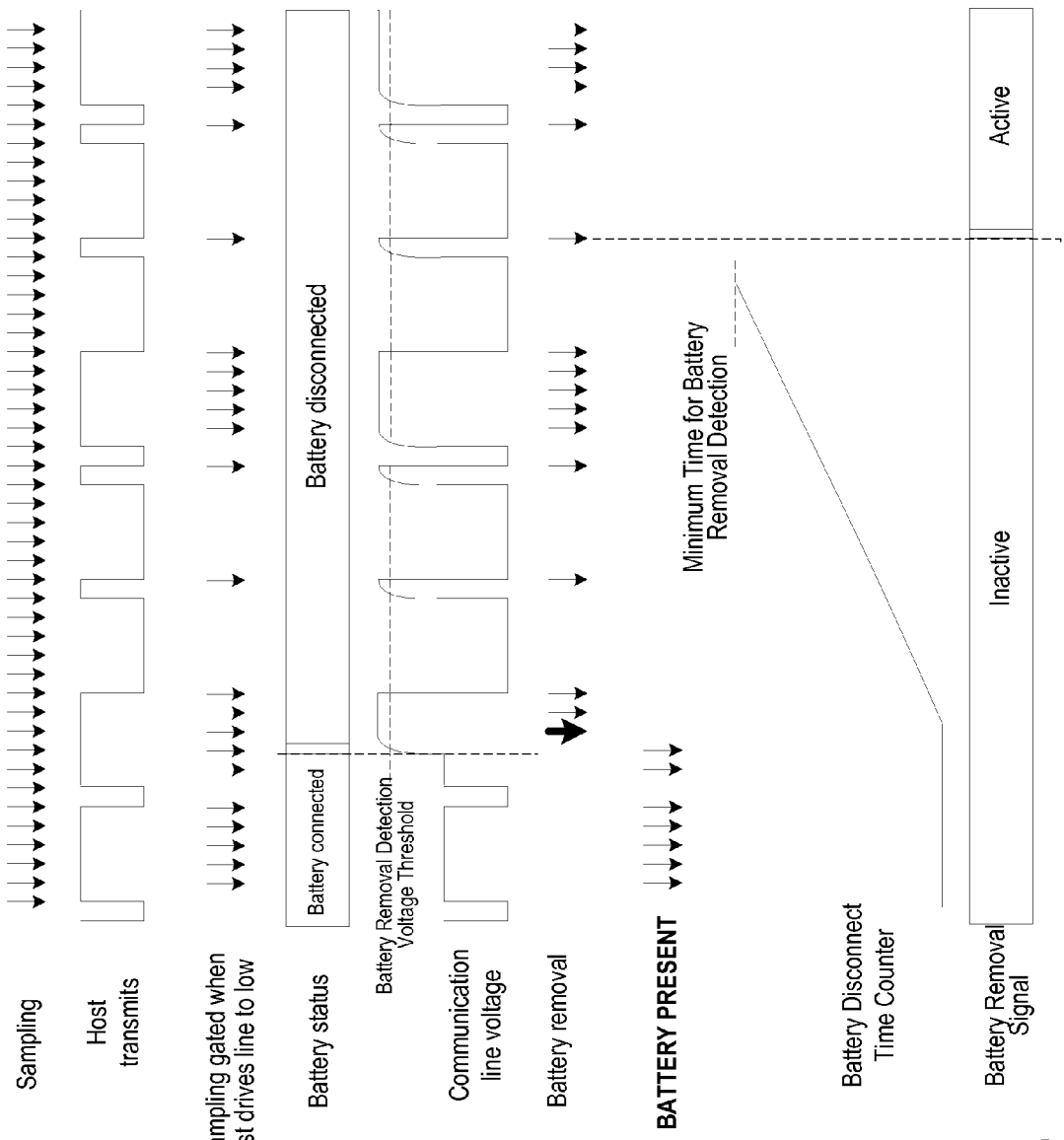
FIG. 3 is an example timing diagram illustrating when the battery pack is disconnected from the terminal and the battery removal signal goes to an active state.

FIG. 3 is an example timing diagram illustrating when the battery pack 150 is disconnected from the terminal 100 and the battery removal signal goes to an active state. Battery removal at the time when terminal 100 is transmitting to the battery pack 150 is illustrated in FIG. 3. The bold arrow shows the time when battery removal circuitry 170 gets its first indication of a possible battery removal. Since in this phase it is not possible to know whether battery pack 150 has been removed or whether battery removal detection voltage threshold has been exceeded because of a short contact break, the disconnect time counter 170 is activated. After the battery disconnect time counter 170 reaches the "minimum time for battery removal detection" value, the battery removal detection circuitry 170 waits until one more battery removal indication is seen before activating "battery removal signal" on line 133C. The "Communication Line Voltage" waveform in the timing diagram illustrates the voltage on communication line connector 140 in FIGS. 2C and 2D. The "Host Transmits" waveform is the T1 input 133A in FIGS. 2A and 2B. The "Battery Disconnect Time Counter" waveform is the timed count being accumulated by the disconnect time counter 170 in FIGS. 2C and 2D. The "Battery Removal Signal" is line 133C output from the disconnect time counter 170.

Figure 4:
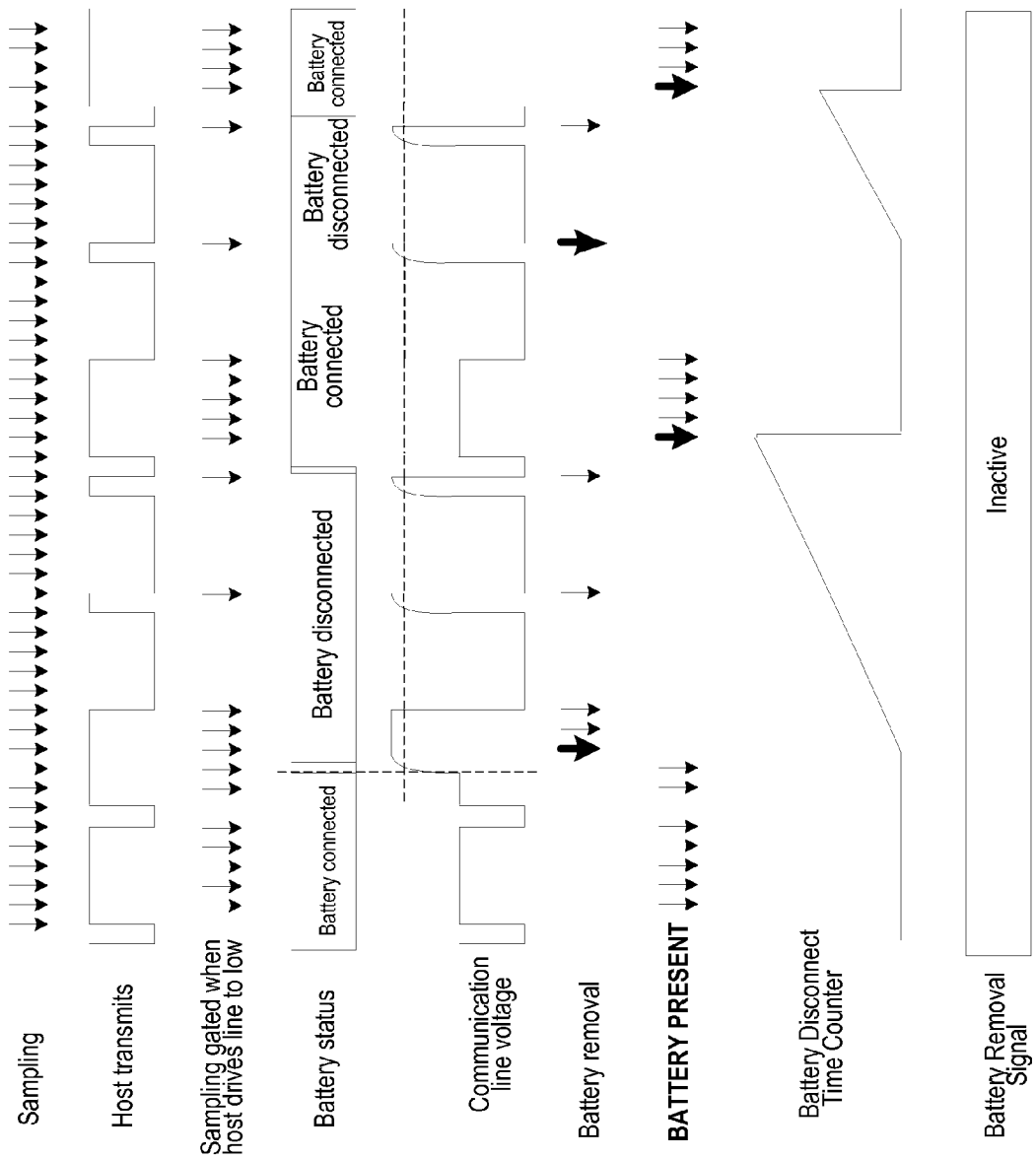
FIG. 4 is an example timing diagram illustrating when two short contact breaks are received at the same time when terminal is transmitting data to the battery pack.

FIG. 4 is an example timing diagram illustrating when two short contact breaks are received at the same time when terminal 100 is transmitting data to the battery pack 150, showing that the battery disconnect time counter is activated twice, but because the contact breaks are of short duration, the time counter is reset in both cases and therefore the battery removal signal is not activated. The "Communication Line Voltage" waveform in the timing diagram illustrates the voltage on communication line connector 140 in FIGS. 2C and 2D. The "Host Transmits" waveform is the T1 input 133A in FIGS. 2A and 2B. The "Battery Disconnect Time Counter" waveform is the timed count being accumulated by the disconnect time counter 170 in FIGS. 2C and 2D. The "Battery Removal Signal" is line 133C output from the disconnect time counter 170.

Figure 5A:
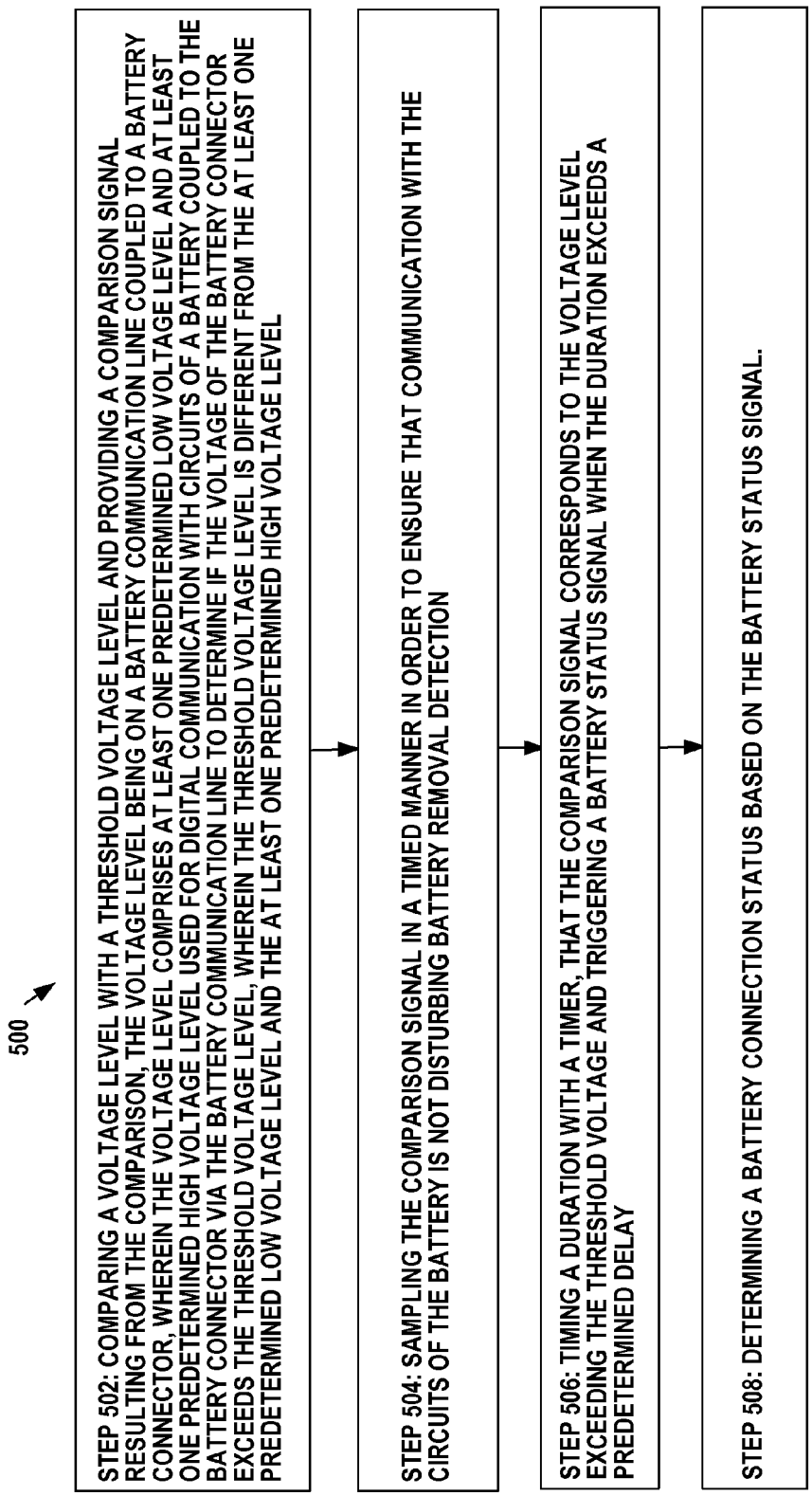
FIG. 5A is an example flow diagram of operational steps in detecting the removal of a smart battery during a data exchange session with the battery.

FIG. 5A is an example flow diagram 500 of operational steps in detecting the removal of a smart battery during a data exchange session with the battery, according to an embodiment of the present invention, with example steps as follows:

Step 502: comparing a voltage level with a threshold voltage level and providing a comparison signal resulting from the comparison, the voltage level being on a battery communication line coupled to a battery connector, wherein the voltage level comprises at least one predetermined low voltage level and at least one predetermined high voltage level used for digital communication with circuits of a battery coupled to the battery connector via the battery communication line to determine if the voltage of the battery connector exceeds the threshold voltage level, wherein the threshold voltage level is different from the at least one predetermined low voltage level and the at least one predetermined high voltage level;

Step 504: sampling the comparison signal in a timed manner in order to ensure that communication with the circuits of the battery is not disturbing battery removal detection;

Step 506: timing a duration with a timer, that the comparison signal corresponds to the voltage level exceeding the threshold voltage and triggering a battery status signal when the duration exceeds a predetermined delay; and Step 508: determining a battery connection status based on the battery status signal.

Figure 5B:
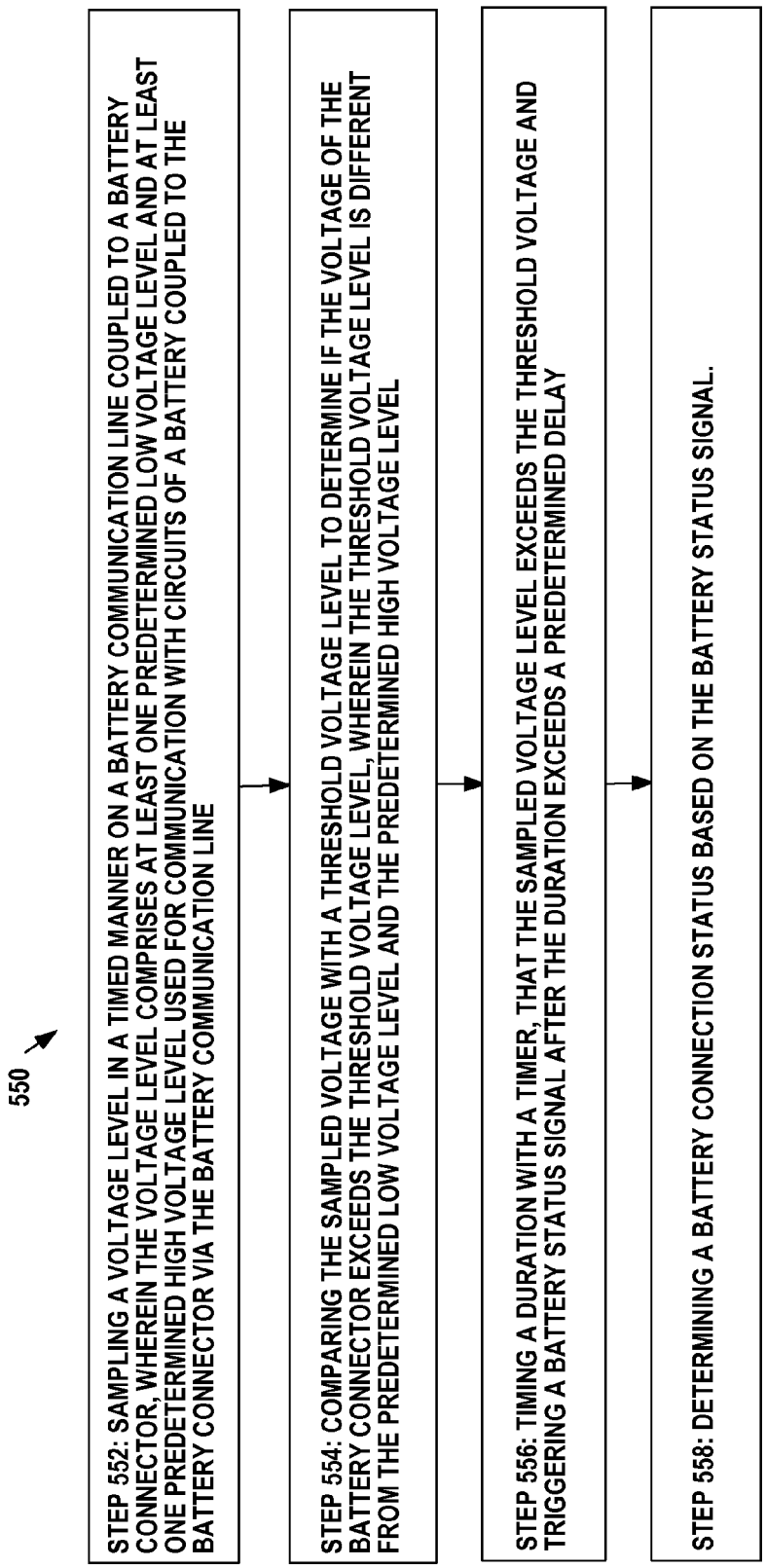
FIG. 5B is an example flow diagram of alternate operational steps in detecting the removal of a smart battery during a data exchange session with the battery.

FIG. 5B is an example flow diagram 550 of alternate operational steps in detecting the removal of a smart battery during a data exchange session with the battery, according to an embodiment of the present invention, with example steps as follows:

Step 552: sampling a voltage level in a timed manner on a battery communication line coupled to a battery connector, wherein the voltage level comprises at least one predetermined low voltage level and at least one predetermined high voltage level used for communication with circuits of a battery coupled to the battery connector via the battery communication line;

Step 554: comparing the sampled voltage level with a threshold voltage level to determine if the voltage of the battery connector exceeds the threshold voltage level, wherein the threshold voltage level is different from the at least one predetermined low voltage level and the at least one predetermined high voltage level;

Step 556: timing a duration with a timer, that the sampled voltage level exceeds the threshold voltage and triggering a battery status signal when the duration exceeds a predetermined delay; and Step 558: determining a battery connection status based on the battery status signal.

The steps of the flow diagrams 500 of FIG. 5A and 550 of FIG. 5B represent computer code instructions stored in the RAM and/or ROM memory of the terminal 100, which when executed by the CPU, carry out the functions of the example embodiments of the invention. The steps may be carried out in another order than shown and individual steps may be combined or separated into component steps.

Figure 6A:
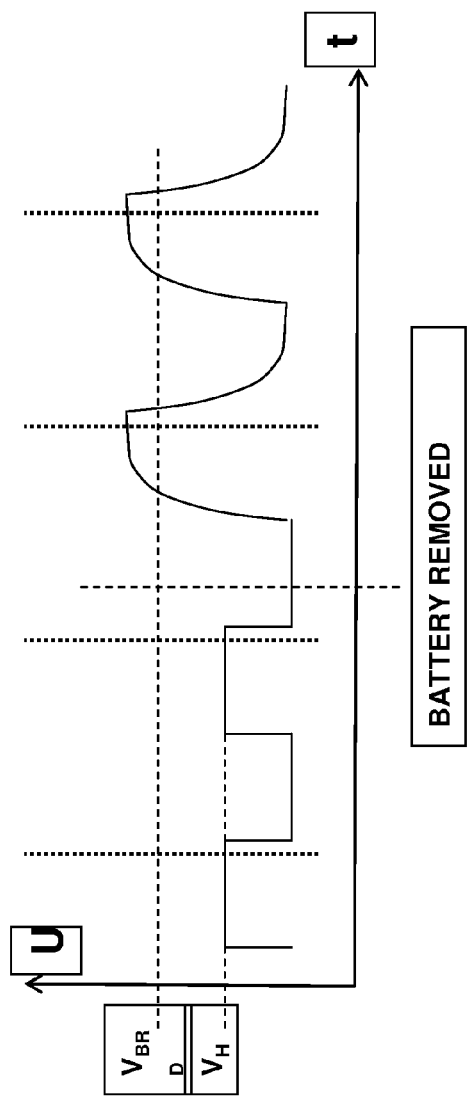
FIGS. 6A and 6B are example timing diagrams illustrating sampling for battery removal detection.
Figure 6B:
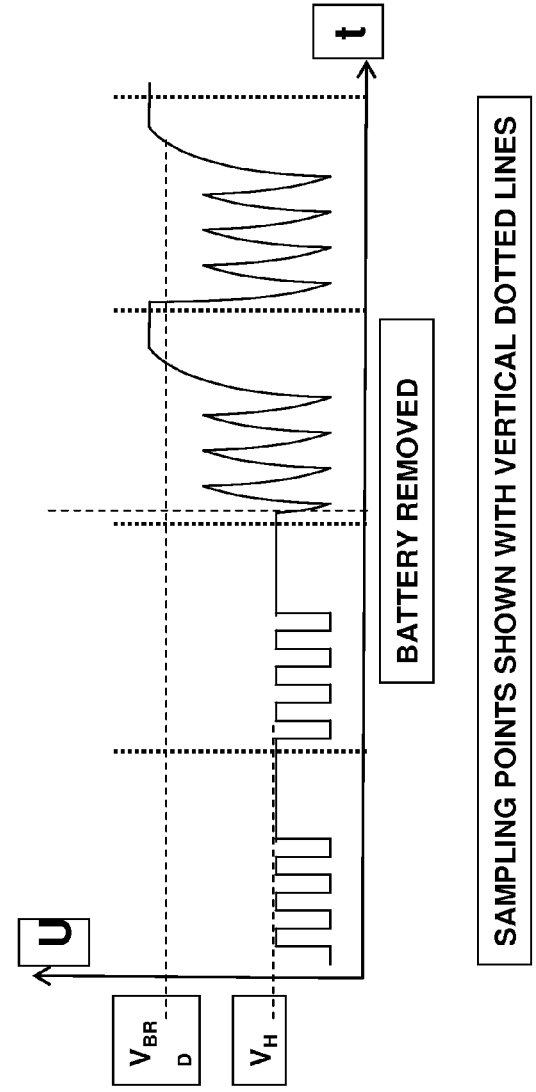

FIGS. 6A and 6B are example timing diagrams illustrating sampling for battery removal detection. FIG. 6A shows the Basic case. The sampling rate is greater or equal than the bit rate and a sample is taken during or between every bit. The waveform is the voltage on battery communication line connector 140 in FIGS. 2C and 2D. $V_H$ is the high voltage level of data communication pulses on communication line connector 140. $V_{BR}$ is the threshold voltage that is compared with the voltage on communication line connector 140. The sampling rate is greater than the bit rate and a sample is taken during or between every bit. When the voltage on communication line connector 140 goes above the $V_{BR}$ threshold voltage for a predetermined duration, the "Battery Removal Signal" is output on line 133C from the disconnect time counter 170.

FIG. 6B shows the high bit rate case. Sampling rate is less than the bit rate and a sample is taken between bursts. A burst may include several bits. During burst transmission, the sampling rate may not be sufficiently high to sample all of the data pulses on line 140 and the battery removal threshold may not be reached by the disconnect time counter 170. However, once the burst ends, the voltage samples rise above the $V_{BR}$ threshold voltage and will be counted for a predetermined duration, resulting in outputting the "Battery Removal Signal" on line 133C from the disconnect time counter 170.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   comparing a digital voltage level of a host device waveform with a threshold voltage level and providing a comparison signal resulting from the comparison, the digital voltage level of the host device waveform being on a battery digital communication line coupled to a battery connector, wherein the digital voltage level of the host device waveform comprises at least one predetermined low digital communication voltage level and at least one predetermined high digital communication voltage level used for digital communication with circuits of a battery capable of digital communication coupled to the battery connector via the battery digital communication line to determine if the voltage of the battery connector exceeds the threshold voltage level, wherein the threshold voltage level is different from the at least one predetermined low digital communication voltage level and the at least one predetermined high digital communication voltage level;
   sampling the comparison signal in a timed manner in order to ensure that digital communication with the circuits of the battery is not disturbing battery removal detection, by gating the sampling when the host device waveform is at the at least one predetermined low digital communication voltage level;
   timing a duration with a timer, that the comparison signal corresponds to the digital voltage level of the host device waveform exceeding the threshold voltage and triggering a battery status signal when the duration exceeds a predetermined delay; and
   determining a battery connection status based on the battery status signal.

2. The method of claim 1, wherein the duration represents a period of time that includes the length of time that the voltage level exceeds the threshold voltage plus the predetermined delay.

3. The method of claim 1, wherein the battery connection status comprises at least a battery connect status or battery disconnect status.

4. The method of claim 3, wherein the battery connection status changes from the battery connect status to the battery disconnect status if the duration exceeds a predetermined duration value.

5. The method of claim 3, wherein the battery connection status changes from the battery disconnect status to the battery connect status if the voltage level is less than the at least one predetermined high digital communication voltage level or greater than the at least one predetermined low digital communication voltage level.

6. The method of claim 1, further comprising:
resetting the timer if the voltage level is less than the at least one predetermined high digital communication voltage level or greater than the at least one predetermined low digital communication voltage level.

7. The method of claim 1, wherein the battery connector has at least two additional connectors.

8. The method of claim 7, wherein the at least two additional connectors are configured to deliver power.

9. The method of claim 1, wherein the sampling, the communication, and detection of battery removal, occur simultaneously.

10. The method of claim 1, further comprising:
receiving a response from the circuits of the battery to data communicated to the battery on the battery communication line during the sampling in the timed manner.

11. The method of claim 1, wherein the communication is a digital communication.

12. The method of claim 1, wherein when the comparing step detects that the voltage of the battery connector is above the threshold voltage, then gating the voltage of the battery connector out as the comparison signal for sampling.

13. An apparatus, comprising:
at least one processor;
at least one memory including computer program code;
the at least one memory and the computer program code configured to, with the at least one processor, cause the apparatus at least to:
compare a digital voltage level of a host device waveform with a threshold voltage level and provide a comparison signal resulting from the comparison, the digital voltage level of the host device waveform being on a battery digital communication line coupled to a battery connector, wherein the digital voltage level of the host device waveform comprises at least one predetermined low digital communication voltage level and at least one predetermined high digital communication voltage level used for digital communication with circuits of a battery capable of digital communication coupled to the battery connector via the battery digital communication line to determine if the voltage of the battery connector exceeds the threshold voltage level, wherein the threshold voltage level is different from the at least one predetermined low digital communication voltage level and the at least one predetermined high digital communication voltage level;
sample the comparison signal in a timed manner in order to ensure that communication with the circuits of the battery is not disturbing battery removal detection, by gating the sampling when the host device waveform is at the at least one predetermined low digital communication voltage level;
time a duration with a timer, that the comparison signal corresponds to the digital voltage level of the host device waveform exceeding the threshold voltage and trigger a battery status signal after the duration exceeds a predetermined delay; and
determine a battery connection status based on the battery status signal.

14. A non-transitory computer readable medium storing program instructions, which when executed by a computer processor, perform the steps comprising:
comparing a digital voltage level of a host device waveform with a threshold voltage level and providing a comparison signal resulting from the comparison, the digital voltage level of the host device waveform being on a battery digital communication line coupled to a battery connector, wherein the digital voltage level of the host device waveform comprises at least one predetermined low digital communication voltage level and at least one predetermined high digital communication voltage level used for digital communication with circuits of a battery capable of digital communication coupled to the battery connector via the battery digital communication line to determine if the voltage of the battery connector exceeds the threshold voltage level, wherein the threshold voltage level is different from the at least one predetermined low digital communication voltage level and the at least one predetermined high digital communication voltage level;
sampling the comparison signal in a timed manner in order to ensure that digital communication with the circuits of the battery is not disturbing battery removal detection, by gating the sampling when the host device waveform is at the at least one predetermined low digital communication voltage level;
timing a duration with a timer, that the comparison signal corresponds to the digital voltage level of the host device waveform exceeding the threshold voltage and triggering a battery status signal when the duration exceeds a predetermined delay; and
determining a battery connection status based on the battery status signal.

15. A method, comprising:
sampling a digital voltage level of a host device waveform in a timed manner on a battery digital communication line coupled to a battery connector, wherein the digital voltage level of the host device waveform comprises at least one predetermined low digital communication voltage level and at least one predetermined high digital communication voltage level used for communication with circuits of a battery capable of digital communication coupled to the battery connector via the battery digital communication line, and gating the sampling when the host device waveform is at the at least one predetermined low digital communication voltage level;
comparing the sampled digital voltage level of the host device waveform with a threshold voltage level to determine if the voltage of the battery connector exceeds the threshold voltage level, wherein the threshold voltage level is different from the at least one predetermined low digital communication voltage level and the at least one predetermined high digital communication voltage level;
timing a duration with a timer, that the sampled digital voltage level of the host device waveform exceeds the threshold voltage and triggering a battery status signal when the duration exceeds a predetermined delay; and
determining a battery connection status based on the battery status signal.

16. The method of claim 15, wherein when sampling the voltage of the battery connector, gating the voltage of the battery connector out as the sampled voltage level for the comparing step.

17. An apparatus, comprising:
at least one processor;
at least one memory including computer program code;
the at least one memory and the computer program code configured to, with the at least one processor, cause the apparatus at least to:
sample a digital voltage level of a host device waveform in a timed manner on a battery digital communication line coupled to a battery connector, wherein the digital voltage level of the host device waveform comprises at least one predetermined low digital communication voltage level and at least one predetermined high digital communication voltage level used for communication with circuits of a battery capable of digital communication coupled to the battery connector via the battery digital communication line, and gate the sampling when the host device waveform is at the at least one predetermined low digital communication voltage level;
compare the sampled digital voltage level of the host device waveform with a threshold voltage level to determine if the voltage of the battery connector exceeds the threshold voltage level, wherein the threshold voltage level is different from the at least one predetermined low digital communication voltage level and the at least one predetermined high digital communication voltage level;
time a duration with a timer, that the sampled digital voltage level of the host device waveform exceeds the threshold voltage and trigger a battery status signal when the duration exceeds a predetermined delay; and
determine a battery connection status based on the battery status signal.

18. A non-transitory computer readable medium storing program instructions, which when executed by a computer processor, perform the steps comprising:
sampling a digital voltage level of a host device waveform in a timed manner on a battery digital communication line coupled to a battery connector, wherein the digital voltage level of the host device waveform comprises at least one predetermined low digital communication voltage level and at least one predetermined high digital communication voltage level used for communication with circuits of a battery capable of digital communication coupled to the battery connector via the battery digital communication line, and gating the sampling when the host device waveform is at the at least one predetermined low digital communication voltage level;
comparing the sampled digital voltage level of the host device waveform with a threshold voltage level to determine if the voltage of the battery connector exceeds the threshold voltage level, wherein the threshold voltage level is different from the at least one predetermined low digital communication voltage level and the at least one predetermined high digital communication voltage level;
timing a duration with a timer, that the sampled digital voltage level of the host device waveform exceeds the threshold voltage and triggering a battery status signal when the duration exceeds a predetermined delay; and
determining a battery connection status based on the battery status signal.

19. An apparatus comprising:
means for comparing a digital voltage level of a host device waveform with a threshold voltage level and providing a comparison signal resulting from the comparison, the digital voltage level of the host device waveform being on a battery digital communication line coupled to a battery connector, wherein the digital voltage level of the host device waveform comprises at least one predetermined low digital communication voltage level and at least one predetermined high digital communication voltage level used for digital communication with circuits of a battery capable of digital communication coupled to the battery connector via the battery digital communication line to determine if the voltage of the battery connector exceeds the threshold voltage level, wherein the threshold voltage level is different from the at least one predetermined low digital communication voltage level and the at least one predetermined high digital communication voltage level;
means for sampling the comparison signal in a timed manner in order to ensure that digital communication with the circuits of the battery is not disturbing battery removal detection, by gating the sampling when the host device waveform is at the at least one predetermined low digital communication voltage level;
means for timing a duration with a timer, that the comparison signal corresponds to the digital voltage level of the host device waveform exceeding the threshold voltage and triggering a battery status signal when the duration exceeds a predetermined delay; and
means for determining a battery connection status based on the battery status signal.

20. An apparatus comprising:
means for sampling a digital voltage level of a host device waveform in a timed manner on a battery digital communication line coupled to a battery connector, wherein the digital voltage level of the host device waveform comprises at least one predetermined low digital communication voltage level and at least one predetermined high digital communication voltage level used for communication with circuits of a battery capable of digital communication coupled to the battery connector via the battery digital communication line, and gating the sampling when the host device waveform is at the at least one predetermined low digital communication voltage level;
means for comparing the sampled digital voltage level of the host device waveform with a threshold voltage level to determine if the voltage of the battery connector exceeds the threshold voltage level, wherein the threshold voltage level is different from the at least one predetermined low digital communication voltage level and the at least one predetermined high digital communication voltage level;
means for timing a duration with a timer, that the sampled digital voltage level of the host device waveform exceeds the threshold voltage and triggering a battery status signal when the duration exceeds a predetermined delay; and
means for determining a battery connection status based on the battery status signal.

21. A system, comprising:
a battery in a battery pack, the battery configured to connect to power connectors of a wireless terminal to provide operating power to the wireless terminal;
battery circuits in the battery pack, the battery circuits associated with the battery capable of digital communication and configured to connect to a battery connector of the wireless terminal; and
a wireless terminal, comprising:
at least one processor;
at least one memory including computer program code;

the at least one memory and the computer program code configured to, with the at least one processor, cause the wireless terminal at least to:

compare a digital voltage level of a waveform of the wireless terminal with a threshold voltage level and provide a comparison signal resulting from the comparison, the digital voltage level of the waveform of the wireless terminal being on a battery digital communication line coupled to the battery connector, wherein the digital voltage level of the waveform of the wireless terminal comprises at least one predetermined low digital communication voltage level and at least one predetermined high digital communication voltage level used for digital communication with circuits of the battery capable of digital communication coupled to the battery connector via the battery digital communication line to determine if the voltage of the battery connector exceeds the threshold voltage level, wherein the threshold voltage level is different from the at least one predetermined low digital communication voltage level and the at least one predetermined high digital communication voltage level;

sample the comparison signal in a timed manner in order to ensure that communication with the circuits of the battery is not disturbing battery removal detection, by gating the sampling when the waveform of the wireless terminal is at the at least one predetermined low digital communication voltage level;

time a duration with a timer, that the comparison signal corresponds to the digital voltage level of the waveform of the wireless terminal exceeding the threshold voltage and trigger a battery status signal after the duration exceeds a predetermined delay; and determine a battery connection status based on the battery status signal.

\* \* \* \* \*